US012719807B2

(12) United States Patent
Deogun et al.

(10) Patent No.: US 12,719,807 B2
(45) Date of Patent: Aug. 25, 2026

(54) DEJITTER TARGET DELAY VALUE BASED ON SILENCE DESCRIPTORS

(71) Applicant: QUALCOMM Incorporated, San Diego, CA (US)

(72) Inventors: Pravjyot Singh Deogun, Bengaluru (IN); Yong Xie, San Diego, CA (US); Carlos Marcelo Dias Pazos, Carlsbad, CA (US); Vikram Singh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 225 days.

(21) Appl. No.: 18/261,956

(22) PCT Filed: Jan. 28, 2022

(86) PCT No.: PCT/US2022/070411

§ 371 (c)(1),
(2) Date: Jul. 18, 2023

(87) PCT Pub. No.: WO2022/212968

PCT Pub. Date: Oct. 6, 2022

(65) Prior Publication Data

US 2024/0089210 A1 Mar. 14, 2024

(30) Foreign Application Priority Data

Mar. 30, 2021 (IN) ............................. 202141014273

(51) Int. Cl.
*H04L 47/283* (2022.01)

(52) U.S. Cl.
CPC .................................. *H04L 47/283* (2013.01)

(58) Field of Classification Search
CPC ... H04L 65/104; H04L 47/32; H04L 65/1043; H04L 7/0278; H04L 27/0012; H04L 65/403; H04L 2012/6481; H04L 65/765; H04L 43/0852; H04L 65/764; H04L 1/205; H04L 43/106; H04L 49/9023;
(Continued)

(56) References Cited

U.S. PATENT DOCUMENTS

2006/0045139 A1 3/2006 Black et al.
2006/0215669 A1 9/2006 Gangadharan et al.
(Continued)

FOREIGN PATENT DOCUMENTS

WO WO-2009093945 A1 7/2009
WO WO-2020122782 A1 * 6/2020 .......... H04L 41/145

OTHER PUBLICATIONS

International Search Report and Written Opinion—PCT/US2022/070411—ISA/EPO—May 9, 2022.

*Primary Examiner* — Djenane M Bayard
(74) *Attorney, Agent, or Firm* — Harrity & Harrity, LLP

(57) ABSTRACT

Various aspects of the present disclosure generally relate to wireless communication. In some aspects, a user equipment (UE) may set a target delay value for a dejitter buffer of the UE based at least in part on jitter delays of silence descriptor (SID) packets that are received by the UE. The UE may receive, after the SID packets, media packets into the dejitter buffer. The UE may release the media packets from the dejitter buffer based at least in part on the target delay value. Numerous other aspects are described.

30 Claims, 9 Drawing Sheets

(58) Field of Classification Search
CPC ......... H04L 12/1822; H04L 2027/0028; H04L 2027/0034; H04L 2027/0053; H04L 25/03044; H04L 5/1438; H04L 65/613; H04L 7/027; H04L 43/0829; H04L 12/6418; H04L 2012/6489; H04L 47/10; H04L 65/80; H04L 47/30; H04L 47/22; H04L 49/90; H04L 65/65; H04L 65/70; H04L 12/56; H04L 2012/6494; H04L 47/2416; H04L 65/401; H04L 65/756; H04L 67/75; H04L 7/0016; H04L 1/1812; H04L 12/00; H04L 2012/5616; H04L 2012/5647; H04L 2012/5649; H04L 2012/5671; H04L 2012/5674; H04L 2012/5681; H04L 2012/6429; H04L 2012/6472; H04L 2012/6475; H04L 2012/6483; H04L 43/087; H04L 49/206; H04L 49/253; H04L 49/30; H04L 49/557; H04L 65/1083; H04L 65/752; H04L 12/66; H04L 47/28; H04L 47/29; H04L 49/9094; H04L 65/1101; H04L 1/0001; H04L 1/0003; H04L 1/0009; H04L 1/0033; H04L 1/1887; H04L 47/11; H04L 47/24; H04L 47/283; H04W 36/0019; H04W 36/02; H04W 80/04; H04W 36/00226; H04W 36/08; H04W 36/304; H04W 28/0231; H04W 28/0242; H04W 28/0252; H04W 28/0268; H04W 28/0289; H04W 28/04; H04W 74/0808; H04W 28/0284; H04W 56/0045; H04W 88/02; H04W 8/04; H04W 28/14

See application file for complete search history.

(56) References Cited

U.S. PATENT DOCUMENTS

| | | | | |
|---|---|---|---|---|
| 2007/0242662 | A1* | 10/2007 | Connor .................. | H04L 12/66 370/352 |
| 2010/0296525 | A1* | 11/2010 | Mahkonen .......... | H04L 47/2416 370/516 |
| 2017/0150187 | A1* | 5/2017 | Yang .................... | H04N 21/242 |
| 2018/0042036 | A1* | 2/2018 | Sadeh ................... | H04L 47/283 |
| 2022/0045962 | A1* | 2/2022 | Roeland ................ | H04L 43/087 |

* cited by examiner

300

Figure 3E:
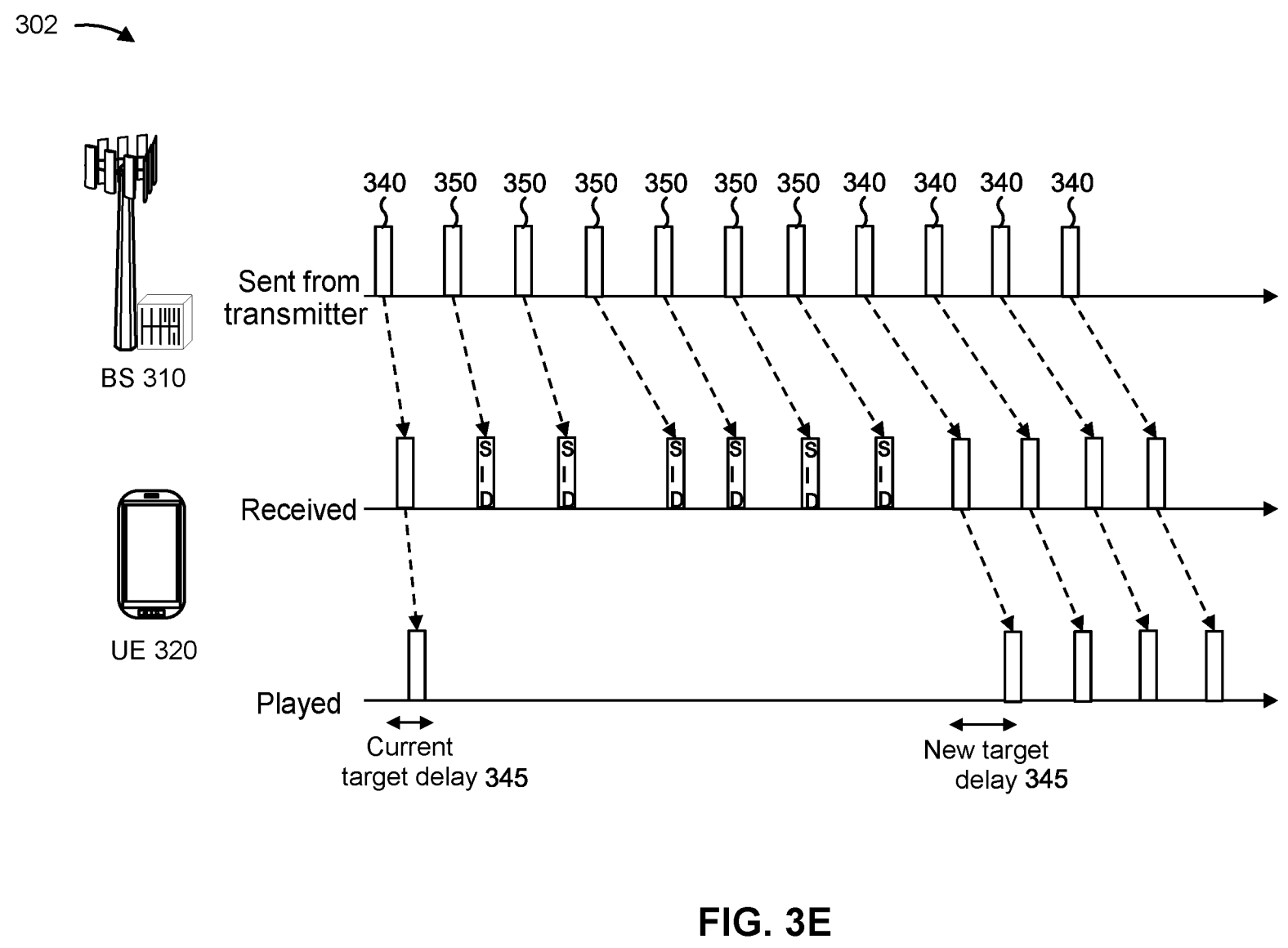

302

BS 310

UE 320

Sent from transmitter

Received

Played 340 350 350 350 350 350 350 340 340 340 340

SID SID SID SID SID SID

Current target delay 345

New target delay 345

DEJITTER TARGET DELAY VALUE BASED ON SILENCE DESCRIPTORS

CROSS-REFERENCE TO RELATED APPLICATIONS

This Patent Application is a 371 national stage of PCT Application No. PCT/US2022/070411 filed on 28 Jan. 2022, entitled "DEJITTER TARGET DELAY VALUE BASED ON SILENCE DESCRIPTORS," which claims priority to India Patent Application No. 202141014273, filed on 30 Mar. 2021, entitled "DEJITTER TARGET DELAY VALUE BASED ON SILENCE DESCRIPTORS," and assigned to the assignee hereof. The disclosure of the prior Applications are considered part of and is are incorporated by reference into this Patent Application.

FIELD OF THE DISCLOSURE

Aspects of the present disclosure generally relate to wireless communication and to techniques and apparatuses for setting a dejitter target delay value based on silence descriptors.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes setting a target delay value for a dejitter buffer of the UE based at least in part on jitter delays of silence descriptor (SID) packets that are received by the UE. The method also includes receiving, after the SID packets, media packets into the dejitter buffer and releasing the media packets from the dejitter buffer based at least in part on the target delay value.

In some aspects, a UE for wireless communication includes a memory and one or more processors, coupled to the memory, configured to set a target delay value for a dejitter buffer of the UE based at least in part on jitter delays of SID packets that are received by the UE. The one or more processors are configured to receive, after the SID packets, media packets into the dejitter buffer and release the media packets from the dejitter buffer based at least in part on the target delay value.

In some aspects, a non-transitory computer-readable medium storing a set of instructions for wireless communication includes one or more instructions that, when executed by one or more processors of a UE, cause the UE to set a target delay value for a dejitter buffer of the UE based at least in part on jitter delays of SID packets that are received by the UE, receive, after the SID packets, media packets into the dejitter buffer, and release the media packets from the dejitter buffer based at least in part on the target delay value.

In some aspects, an apparatus for wireless communication includes means for setting a target delay value for a dejitter buffer of the apparatus based at least in part on jitter delays of SID packets that are received by the apparatus, means for receiving, after the SID packets, media packets into the dejitter buffer, and means for releasing the media packets from the dejitter buffer based at least in part on the target delay value.

Aspects generally include a method, apparatus, system, computer program product, non-transitory computer-readable medium, UE, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A-3E are diagrams illustrating examples of setting a dejitter target delay value based on silence descriptors, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
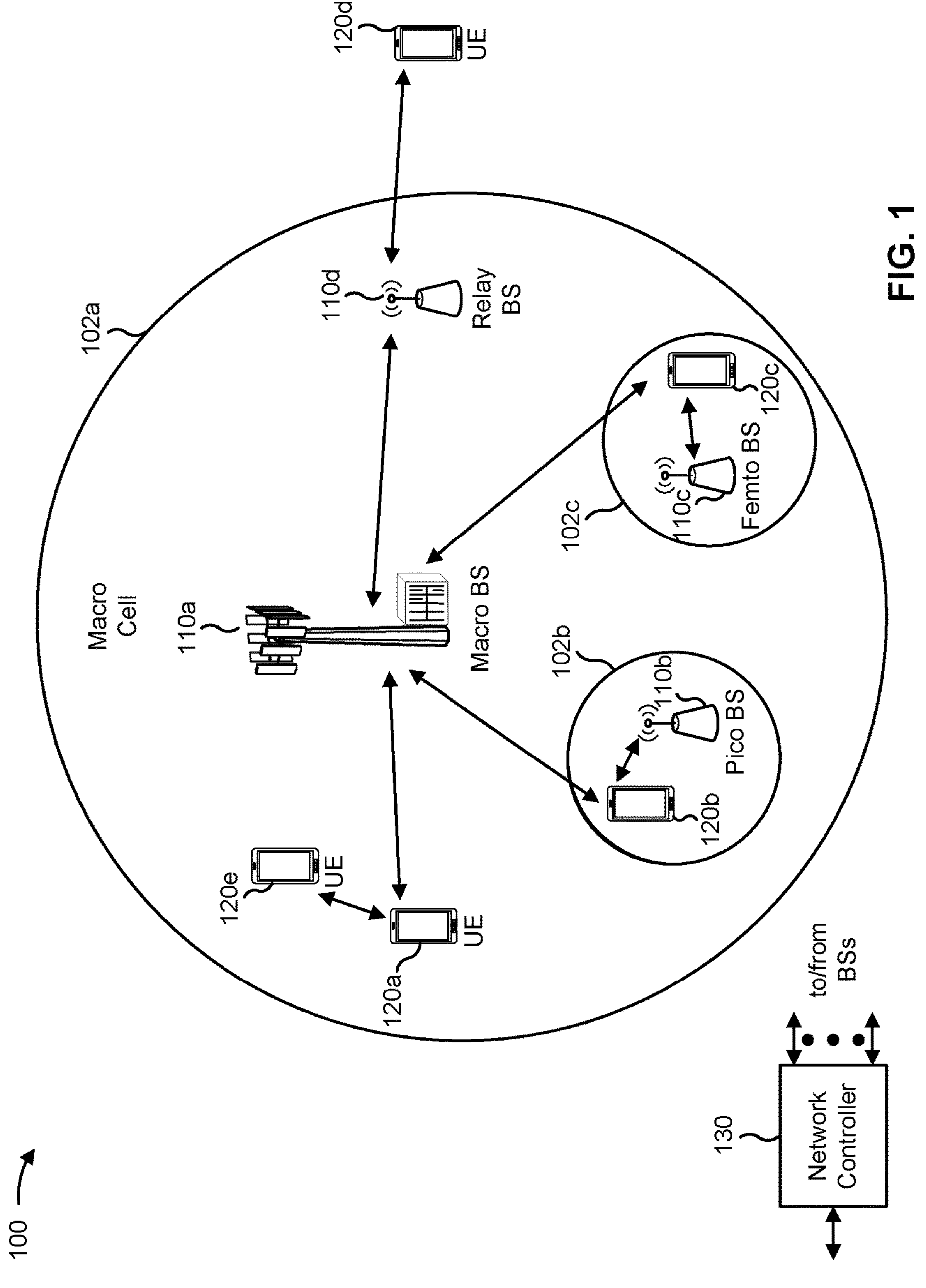
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
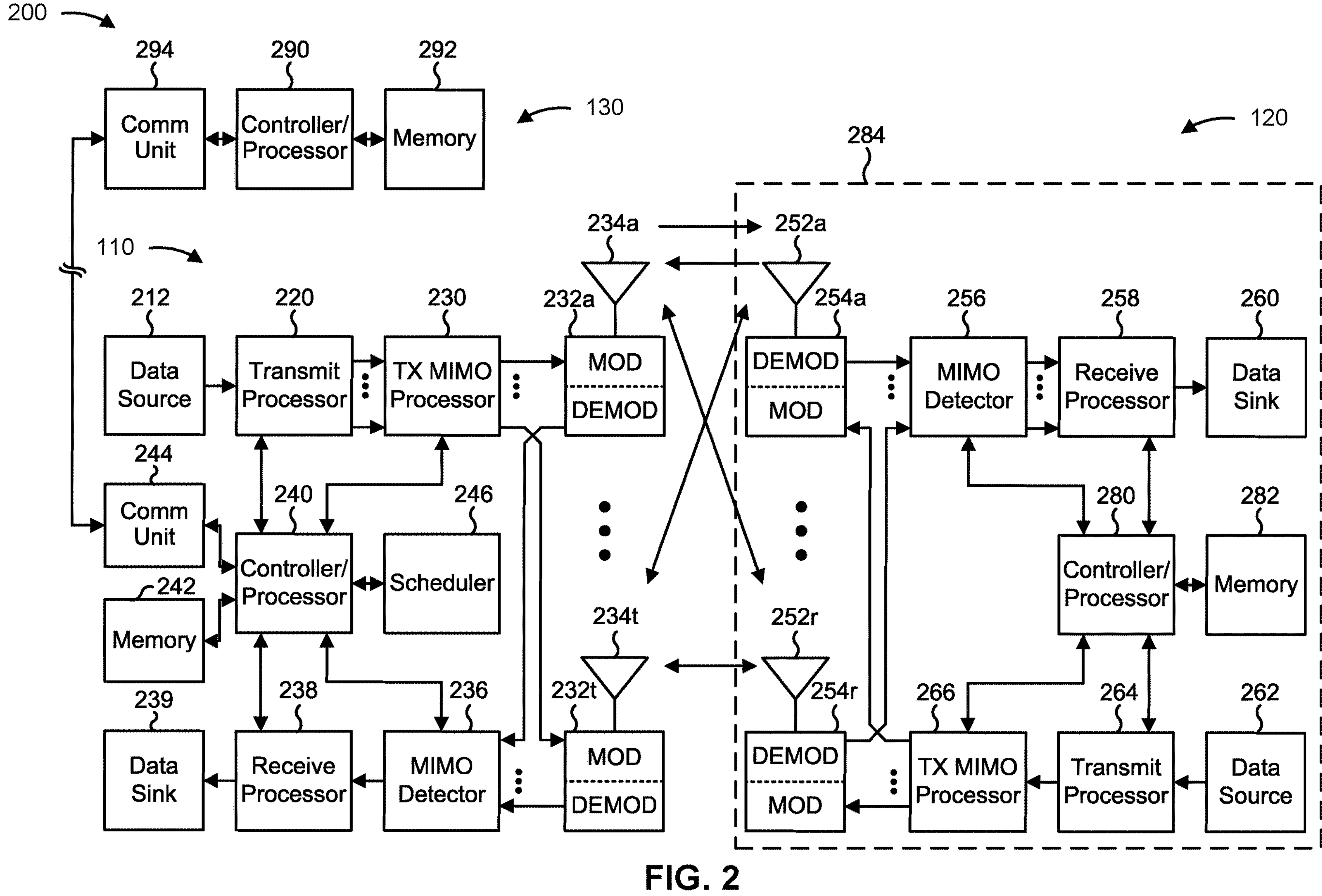
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

One or more antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3A-5).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3A-5).

Controller/processor 240 of base station 110, controller/processor 280 of UE 120, and/or any other component(s) of FIG. 2 may perform one or more techniques associated with setting a dejitter target delay value based on silence descriptors (SIDs), as described in more detail elsewhere herein. For example, controller/processor 240 of base station 110, controller/processor 280 of UE 120, and/or any other component(s) of FIG. 2 may perform or direct operations of, for example, process 400 of FIG. 4, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, and/or other processes as described herein. In some aspects, executing instructions may include running the instructions, converting the instructions, compiling the instructions, and/or interpreting the instructions, among other examples.

In some aspects, the UE 120 includes means for setting a target delay value for a dejitter buffer of the UE 120 based at least in part on jitter delays of SID packets that are received by the UE, means for receiving, after the SID packets, media packets into the dejitter buffer, and/or means for releasing the media packets from the dejitter buffer based at least in part on the target delay value. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3A:
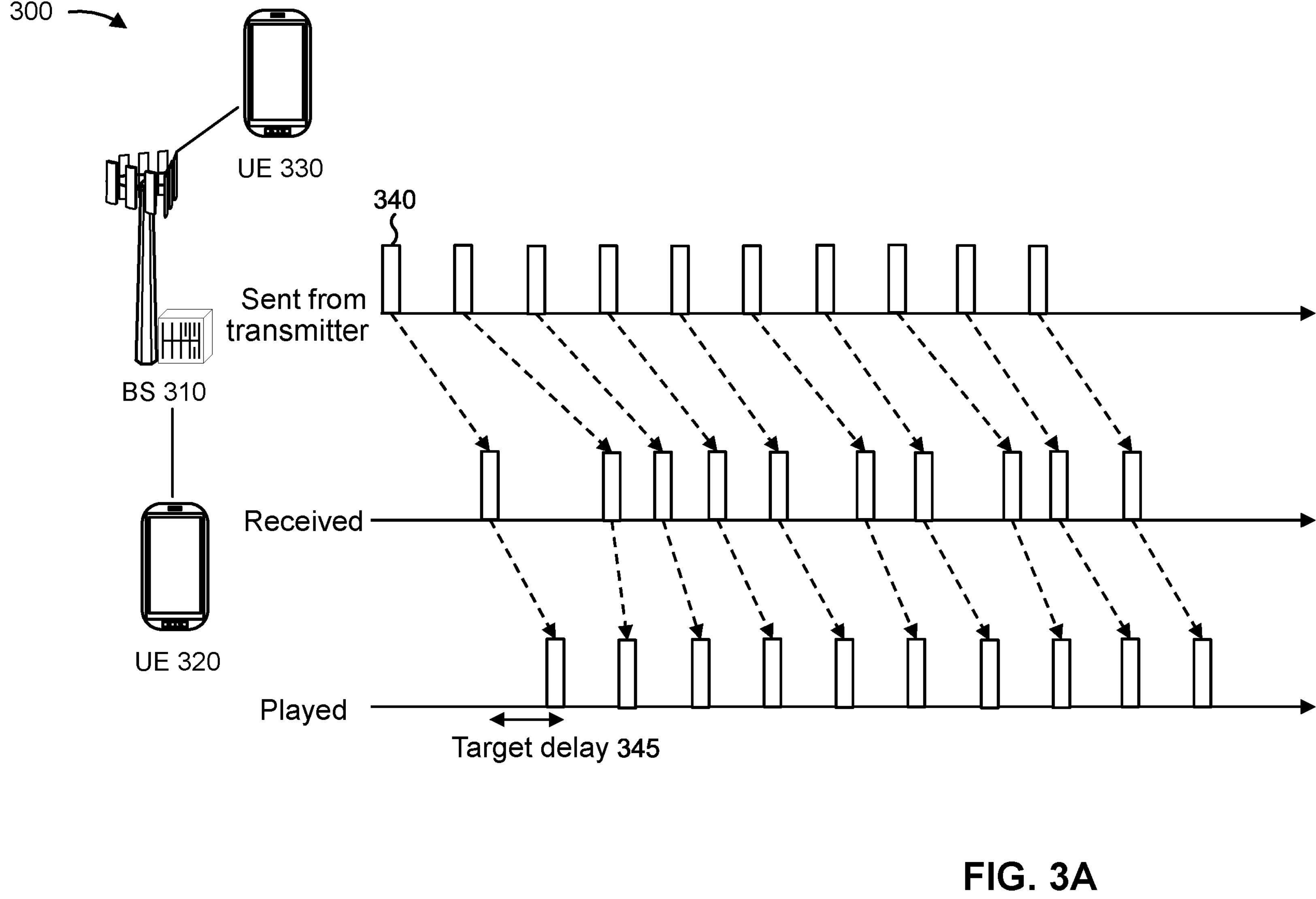

FIGS. 3A-3E are diagrams illustrating examples 300 and 302 of setting a dejitter target delay value based on SIDs, in accordance with the present disclosure. Example 300 shows a base station (BS) 310 (e.g., BS 110) and a UE 320 (e.g., UE 120) that may communicate with one another. UE 320 may communicate with UE 330 via BS 310. Example 300 is shown in FIGS. 3A-3D, and example 302 is shown in FIG. 3E.

Figure 3B:
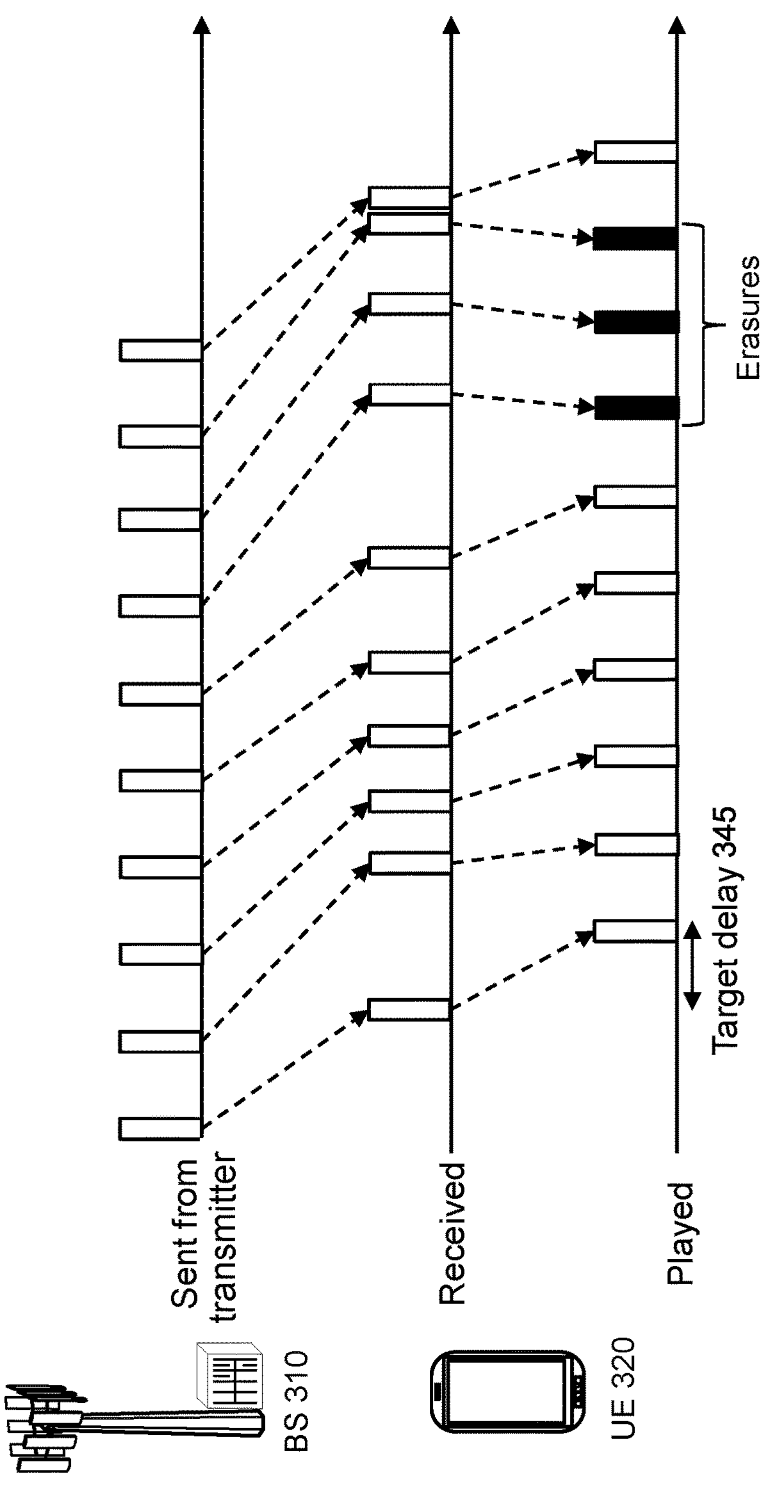

Example 300 in FIG. 3A shows media packets 340 that may be received by the UE 320 as part of a voice call or video call with UE 330, via BS 310. The media packets 340 may include voice packets, video packets, gaming packets, and/or other packets that hold media content as part of an active or live media stream. UE 320 may receive the media packets 340 into a dejitter buffer, because the media packets 340 may suffer time-varying delays (also known as jitter) in the network. Jitter can cause a scenario where a media playback component of the UE 320 is ready to play a next media packet in a time resource, but a jitter delay of the next media packet caused the next media packet to be received too late to be played in the time resource. Jitter delay may be a varying delay that is in addition to an expected propagation delay. Jitter delay may include a difference in delay between two packets. Media packets that go missing or arrive too late, due to jitter delays, can cause an erasure or underflow of the media packets 340, as shown by FIG. 3B. This leads to degradation of voice and/or video quality. In some scenarios, network jitter may change significantly before or after a handover of the UE 320.

Figure 3C:
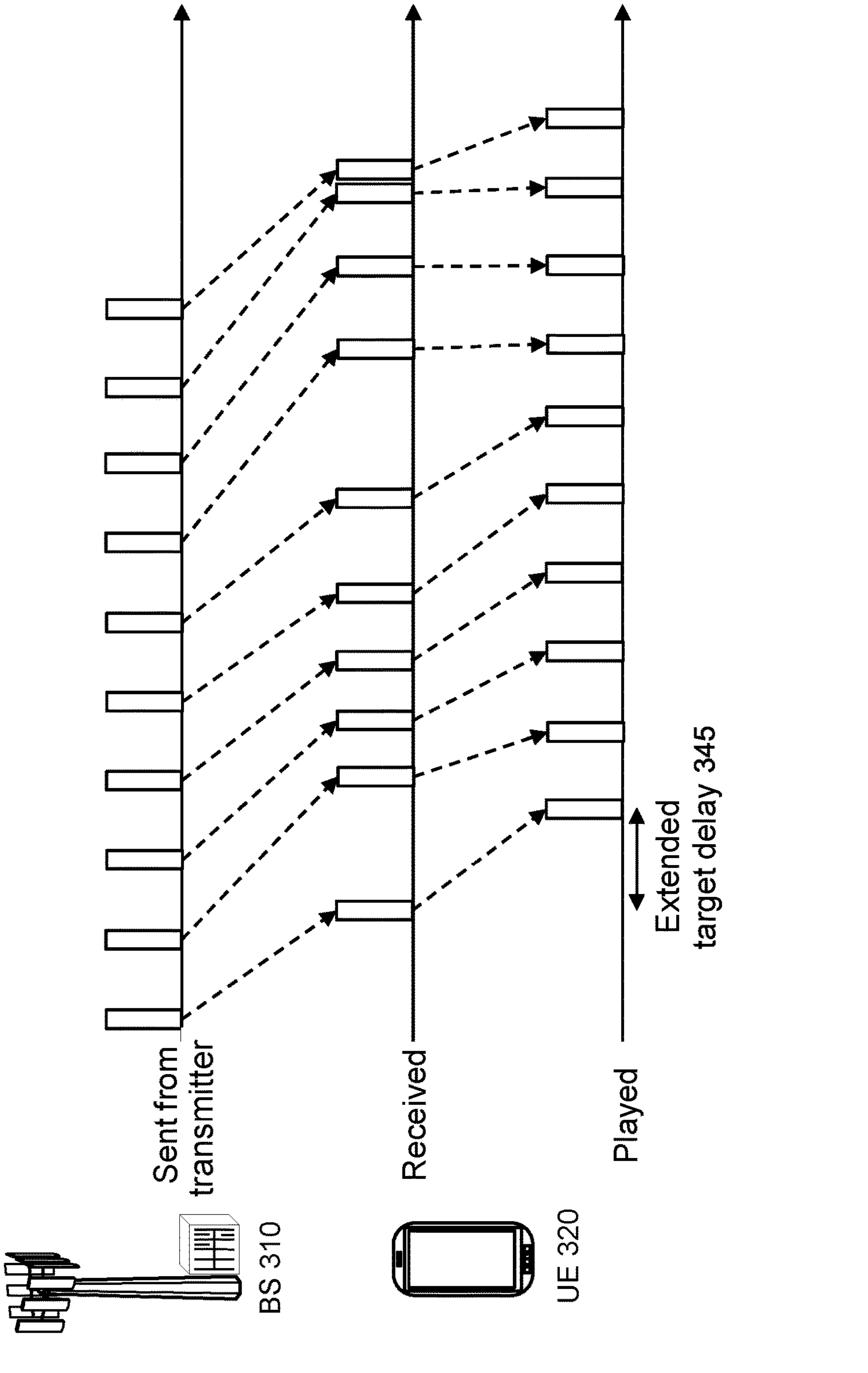

The UE 320 may use the dejitter buffer to "dejitter" or remove the jitter delay variance from the media packets 340, so that a user of the UE 320 is not aware of jitter in the network. The dejitter buffer may include memory (e.g., memory 282) in UE 320 that stores the media packets 340 that are received. The dejitter buffer may delay when the media packets 340 are released for audio decoding, so that the media packets may be captured and/or reordered as necessary for playback in a correct order and at expected time intervals. The delay may be an intentional delay referred to as a "target delay" 345. The target delay 345 may be a time duration between when a media packet is received into the dejitter buffer and when the media packet is to be released from the dejitter buffer. In some aspects, the target delay 345 may include time for awaiting a packet into the dejitter buffer and may start at the expected time for receiving the media packet. The UE 320 may extend the target delay 345, as shown by FIG. 3C, to help collect and buffer the media packets 340 such that they are played when expected without any unwanted interruption in the media playout due to underflow. While the target delay 345 may be used to handle network jitter, if the target delay 345 is too long, this causes a larger end-to-end delay that may also be perceived as degraded voice and/or video quality. In other words, if the target delay 345 is too short, underflows degrade a voice call, and if the target delay 345 is too long, the end-to-end delay degrades the voice call. Degraded communications may waste processing resources and signaling resources.

Figure 3D:
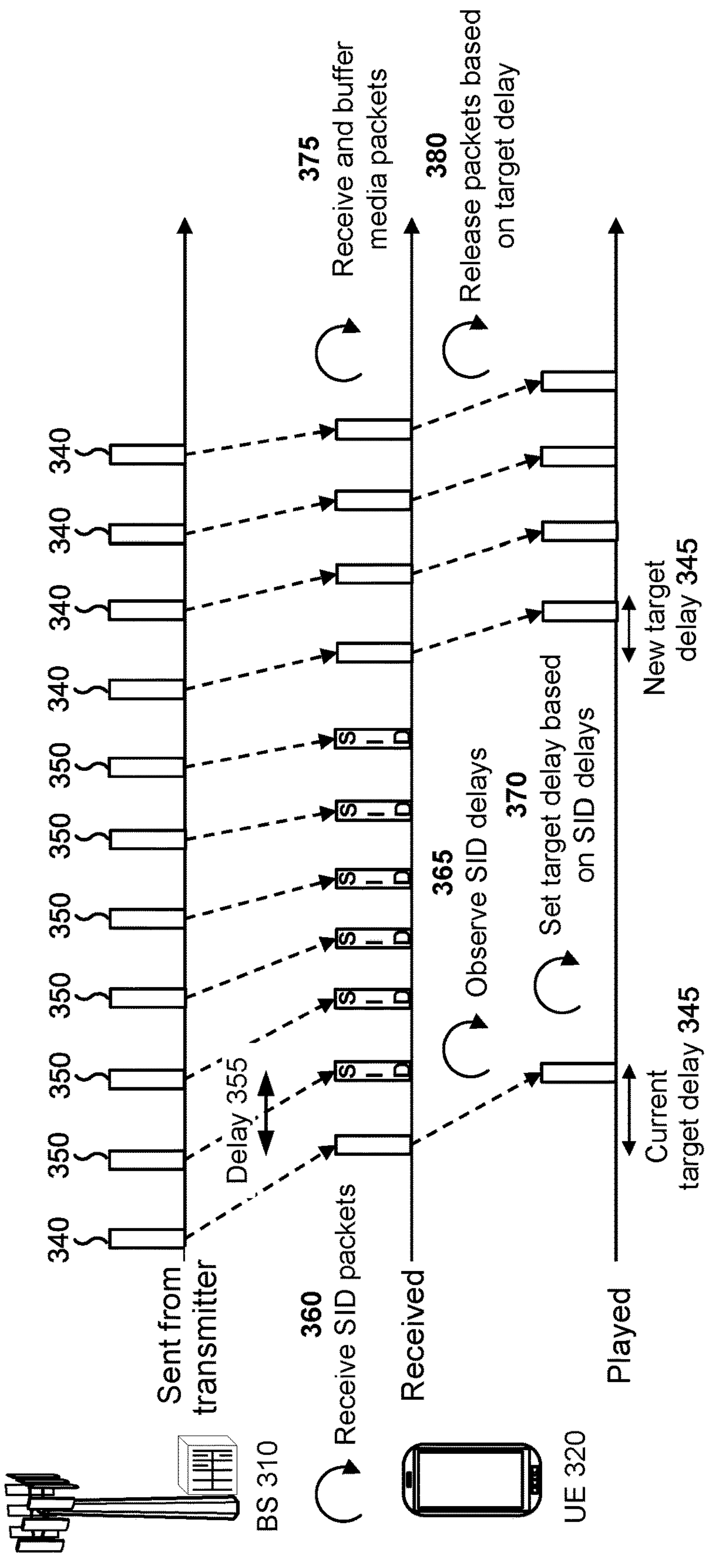

According to various aspects described herein, as shown in FIG. 3D, the UE 320 may set a value of the target delay 345 of the dejitter buffer based at least in part on a behavior (e.g., jitter delays) of SID packets 350. The SID packets 350 may indicate the silence (or no new content) in between the media packets 340. SIDs may include any descriptors indicating that a packet is a silent packet or a packet that is in an expected time slot without audio content for playback. FIG. 3D shows a delay 355 that may include a propagation delay between the BS 310 and the UE 320 and a jitter delay (or no jitter delay). In some aspects, the UE 320 may set the value of the target delay 345 based at least in part on the jitter delays of the SID packets 350, an average jitter delay of the SID packets 350, a range of jitter delays of the SID packets 350, a set of longer jitter delays of the SID packets 350, and/or another overall value representing the jitter delays of the SID packets 350. Setting the value of the target delay 345 may include adjusting (e.g., increasing, decreasing) an existing value of the target delay 345.

As shown by reference number 360, the UE 320 may receive the SID packets 350. As shown by reference number 365, the UE 320 may observe the jitter delays of the SID packets 350. As shown in FIG. 3D, the jitter delays of the SID packets 350 are decreasing, indicating that network jitter is decreasing. This means that the value of the target delay 345 may decrease for future media packets 340, which may help to reduce end-to-end latency and maintain the quality of the user experience. As shown by reference number 370, the UE 320 may set a (new) value of the target delay 345 based at least in part on the jitter delays of the SID packets 350. As shown by reference number 375, the UE 320 may receive and buffer some more of the media packets 340 in the dejitter buffer. As shown by reference number 380, the UE 320 may release the media packets 340 based at least in part on the value of the target delay 345. The UE 320 may decode and play the media packets 340 in regular order.

By determining the value of the target delay 345 based at least in part on the jitter delays (or no jitter delays) of the SID packets 350, the UE 320 may set a more optimal target delay 345 for releasing the media packets 340 from the dejitter buffer for playback. As a result, the UE 320 may conserve processing resources and signaling resource by avoiding degraded communications. While some solutions may determine or adjust the value of the target delay 345 based on a behavior of the media packets 340, the behavior of the media packets 340 may not capture a presence of network jitter at a start of a voice call or changes in the network jitter during silent periods between the media packets 340. For example, when the UE 320 is involved in a conference call in which the user of the UE 320 is presenting on the uplink and mostly SID packets are received on the downlink (conference call participants are only listening), when a participant starts to speak on the downlink, any information about jitter delays of voice packets from the last time the participant spoke may be too old.

In some aspects, the UE 320 may set the value of the target delay 345 based at least in part on packet statistics or filter parameters of the SID packets 350. The packet statistics may include information about dropped SID packets, successful SID packets, a timing of the SID packets 350, a quantity of the SID packets 350, and/or a signal strength of the SID packets 350. The packet statistics may include an average value of jitter delays, a maximum value of jitter delays, a minimum value of jitter delays, a 95 percentile value of jitter delays, and/or another percentile value of the jitter delays. The filter parameters may be used to determine the packet statistics. The filter parameters may include an average windowing size, an average weight applied to each sample of an SID jitter delay, and/or an average weight for an overall SID jitter delay value. The filter parameters may include time thresholds, size thresholds, quality thresholds, and/or packet type parameters. The packet statistics and filter parameters may be different between the SID packets 350 and the media packets 340.

In some aspects, the UE 320 may set the value of target delay 345 (based at least in part on the jitter delays of the SID packets 350) independently of jitter delays of any of the media packets 340. That is, the jitter delays of the media packets 340 may not be factored into the value of the target delay 345, because the frequency (e.g., 160 ms) and distribution of the SID packets 350 may differ from the frequency (e.g., 20 ms) and distribution of the media packets 340. In fact, the UE 320 may set the value of the target delay 345 only if a difference between the jitter delays of the SID packets 350 and the jitter delays of the media packets 340 (e.g., average difference) satisfies a difference threshold (e.g., minimum difference) or if an age of the media packets 340 satisfies an age threshold (e.g., minimum time duration since being received, minimum time duration since a determination or update of jitter delays of the media packets 340).

FIG. 3E shows example 302, where jitter delays of the SID packets 350 are increasing, indicating an increase in network jitter that may affect future media packets 340. The UE 320 may set a new value of the target delay 345 that is longer than a current value of the target delay 345. The UE 320 may use a condition and/or a threshold for when to update the value of the target delay 345 based on the jitter delays of the SID packets 350.

In some aspects, the UE 320 may update the value of the target delay 345 if a current value of the target delay 345 is smaller than a candidate value of the target delay 345 that is computed based at least in part on the jitter delays of the SID packets 350. The UE 320 may determine the candidate value of the target delay 345 by multiplying an SID jitter value (e.g., average jitter delay for the SID packets 350, an overall value representing the SID packets 350) by a scaling factor (e.g., 1.5, 2, 3). The scaling factor may be used to adjust how influential the SID packets 350 are for setting the value of target delay 345. The UE 320 may set the value of the target delay 345 based at least in part on whether the current value or the candidate value is larger. By using the jitter delays of the SID packets, the UE 320 may provide better communication quality.

Figure 4:
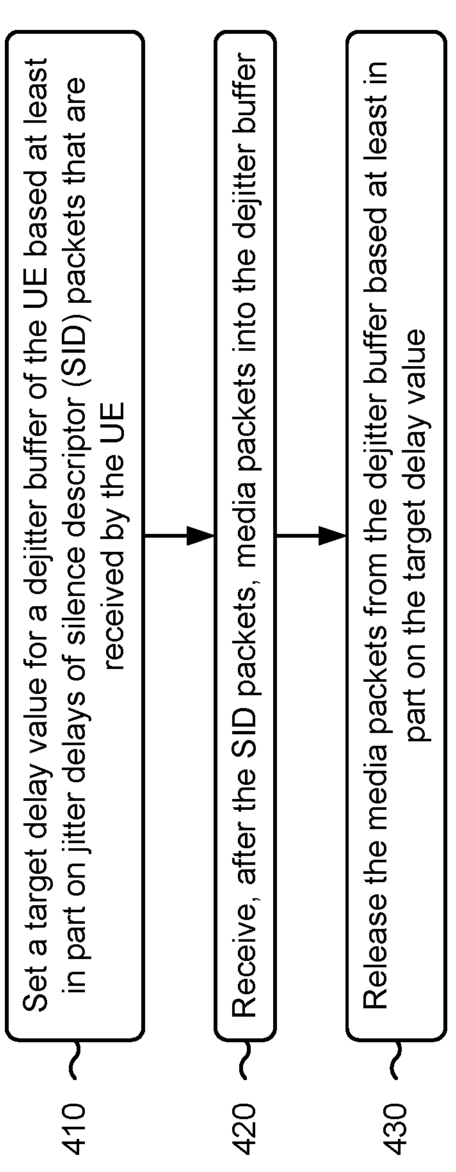
FIG. 4 is a diagram illustrating an example process performed, for example, by a UE, in accordance with the present disclosure.

FIG. 4 is a diagram illustrating an example process 400 performed, for example, by a UE, in accordance with the present disclosure. Example process 400 is an example where the UE (e.g., UE 120, UE 320) performs operations associated with setting and using a dejitter target delay value that is based at least in part on silence descriptors.

As shown in FIG. 4, in some aspects, process 400 may include setting a target delay value for a dejitter buffer of the UE based at least in part on jitter delays of SID packets that are received by the UE (block 410). For example, the UE (e.g., using buffering component 508 depicted in FIG. 5) may set a target delay value for a dejitter buffer of the UE based at least in part on jitter delays of SID packets that are received by the UE, as described above.

As further shown in FIG. 4, in some aspects, process 400 may include receiving, after the SID packets, media packets into the dejitter buffer (block 420). For example, the UE (e.g., using reception component 502 depicted in FIG. 5) may receive, after the SID packets, media packets into the dejitter buffer, as described above.

As further shown in FIG. 4, in some aspects, process 400 may include releasing the media packets from the dejitter buffer based at least in part on the target delay value (block 430). For example, the UE (e.g., using buffering component 508 depicted in FIG. 5) may release the media packets from the dejitter buffer based at least in part on the target delay value, as described above.

Process 400 may include additional aspects, such as any single aspect or any combination of aspects described below and/or in connection with one or more other processes described elsewhere herein.

In a first aspect, the setting includes setting the target delay value independently of jitter delays of media packets.

In a second aspect, alone or in combination with the first aspect, the setting includes setting the target delay value further based at least in part on one or more of packet statistics or filter parameters of the SID packets, independently of packet statistics and filter parameters of media packets.

In a third aspect, alone or in combination with one or more of the first and second aspects, the setting includes setting the target delay value independently of jitter delays of media packets if a difference between the jitter delays of the SID packets and the jitter delays of the media packets satisfies a difference threshold.

In a fourth aspect, alone or in combination with one or more of the first through third aspects, the setting includes setting the target delay value independently of jitter delays of media packets if the jitter delays of media packets are not available or are older than an age threshold.

In a fifth aspect, alone or in combination with one or more of the first through fourth aspects, the setting includes setting the target delay value if a current target delay value is smaller than a candidate target delay value that is computed based at least in part on the jitter delays of the SID packets.

In a sixth aspect, alone or in combination with one or more of the first through fifth aspects, the candidate target delay value is computed based at least in part on an overall jitter value of the SID packets multiplied by a scaling factor.

In a seventh aspect, alone or in combination with one or more of the first through sixth aspects, process 400 includes decoding the media packets that are released from the dejitter buffer, and processing the decoded media packets for media output.

In an eighth aspect, alone or in combination with one or more of the first through seventh aspects, process 400 includes outputting the media output.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
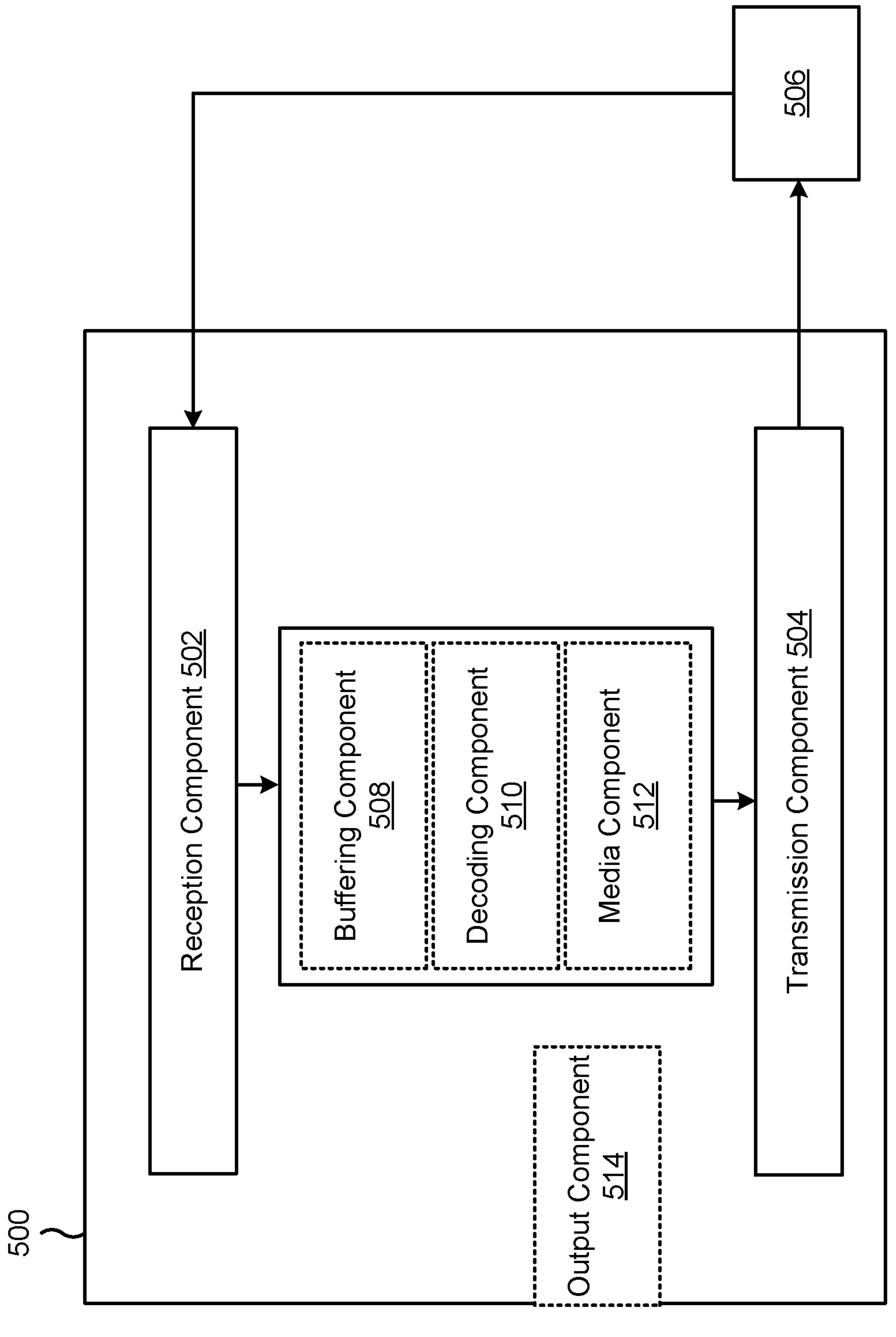
FIG. 5 is a block diagram of an example apparatus for wireless communication, in accordance with the present disclosure.

FIG. 5 is a block diagram of an example apparatus 500 for wireless communication. The apparatus 500 may be a UE (e.g., a UE 120, UE 320), or a UE may include the apparatus 500. In some aspects, the apparatus 500 includes a reception component 502 and a transmission component 504, which may be in communication with one another (for example, via one or more buses and/or one or more other components). As shown, the apparatus 500 may communicate with another apparatus 506 (such as a UE, a base station, or another wireless communication device) using the reception component 502 and the transmission component 504. As further shown, the apparatus 500 may include a buffering component 508, a decoding component 510, a media component 512, and/or an output component 514, among other examples.

In some aspects, the apparatus 500 may be configured to perform one or more operations described herein in connection with FIGS. 1, 2, and 3A-3E. Additionally, or alternatively, the apparatus 500 may be configured to perform one or more processes described herein, such as process 400 of FIG. 4. In some aspects, the apparatus 500 and/or one or more components shown in FIG. 5 may include one or more components of the UE described above in connection with FIG. 2. Additionally, or alternatively, one or more components shown in FIG. 5 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 502 may receive communications, such as reference signals, control information, data communications, or a combination thereof, from the apparatus 506. The reception component 502 may provide received communications to one or more other components of the apparatus 500. In some aspects, the reception component 502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 500. In some aspects, the reception component 502 may include one or more antennas, a demodulator, a MIMO detector, a receive processor, a controller/processor, a memory, or a combination thereof, of the UE described above in connection with FIG. 2.

The transmission component 504 may transmit communications, such as reference signals, control information, data communications, or a combination thereof, to the apparatus 506. In some aspects, one or more other components of the apparatus 500 may generate communications and may provide the generated communications to the transmission component 504 for transmission to the apparatus 506. In some aspects, the transmission component 504 may perform signal processing on the generated communications (such as filtering, amplification, modulation, digital-to-analog conversion, multiplexing, interleaving, mapping, or encoding, among other examples), and may transmit the processed signals to the apparatus 506. In some aspects, the transmission component 504 may include one or more antennas, a modulator, a transmit MIMO processor, a transmit processor, a controller/processor, a memory, or a combination thereof, of the UE described above in connection with FIG. 2. In some aspects, the transmission component 504 may be co-located with the reception component 502 in a transceiver.

The buffering component 508 may set a target delay value for a dejitter buffer of the UE based at least in part on jitter delays of SID packets that are received by the UE. The reception component 502 may receive, after the SID packets, media packets into the dejitter buffer. The buffering component 508 may release the media packets from the dejitter buffer based at least in part on the target delay value. The buffering component 508 may include, control, or coordinate with the dejitter buffer.

The decoding component 510 may decode the media packets that are released from the dejitter buffer. The media component 512 may process the decoded media packets for media output. The media output may be audio and/or video.

The output component 514 may output the media output. The output component 514 may include speaker and/or display screen.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of (one or more) components shown in FIG. 5 may perform one or more functions described as being performed by another set of components shown in FIG. 5.

The foregoing disclosure provides illustration and description, but is not intended to be exhaustive or to limit the aspects to the precise forms disclosed. Modifications and variations may be made in light of the above disclosure or may be acquired from practice of the aspects.

The following provides an overview of some Aspects of the present disclosure:

Aspect 1: A method of wireless communication performed by a user equipment (UE), comprising: setting a target delay value for a dejitter buffer of the UE based at least in part on jitter delays of silence descriptor (SID) packets that are received by the UE; receiving, after the SID packets, media packets into the dejitter buffer; and releasing the media packets from the dejitter buffer based at least in part on the target delay value.

Aspect 2: The method of Aspect 1, wherein the setting includes setting the target delay value independently of jitter delays of media packets.

Aspect 3: The method of Aspect 2, wherein the setting includes setting the target delay value further based at least in part on one or more of packet statistics or filter parameters of the SID packets, independently of packet statistics and filter parameters of media packets.

Aspect 4: The method of any of Aspects 1-3, wherein the setting includes setting the target delay value independently of jitter delays of media packets if a difference between the jitter delays of the SID packets and the jitter delays of the media packets satisfies a difference threshold.

Aspect 5: The method of any of Aspects 1-4, wherein the setting includes setting the target delay value independently of jitter delays of media packets if the jitter delays of media packets are not available or are older than an age threshold.

Aspect 6: The method of any of Aspects 1-5, wherein the setting includes setting the target delay value if a current target delay value is smaller than a candidate target delay value that is computed based at least in part on the jitter delays of the SID packets.

Aspect 7: The method of Aspect 6, wherein the candidate target delay value is computed based at least in part on an overall jitter value of the SID packets multiplied by a scaling factor.

Aspect 8: The method of any of Aspects 1-7, further comprising: decoding the media packets that are released from the dejitter buffer; and processing the decoded media packets for media output.

Aspect 9: The method of Aspect 8, further comprising outputting the media output.

Aspect 10: An apparatus for wireless communication at a device, comprising a processor; memory coupled with the processor; and instructions stored in the memory and executable by the processor to cause the apparatus to perform the method of one or more of Aspects 1-9.

Aspect 11: A device for wireless communication, comprising a memory and one or more processors coupled to the memory, the memory and the one or more processors configured to perform the method of one or more of Aspects 1-9.

Aspect 12: An apparatus for wireless communication, comprising at least one means for performing the method of one or more of Aspects 1-9.

Aspect 13: A non-transitory computer-readable medium storing code for wireless communication, the code comprising instructions executable by a processor to perform the method of one or more of Aspects 1-9.

Aspect 14: A non-transitory computer-readable medium storing a set of instructions for wireless communication, the set of instructions comprising one or more instructions that, when executed by one or more processors of a device, cause the device to perform the method of one or more of Aspects 1-9.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:

setting a target delay value for a dejitter buffer of the UE based at least in part on an average jitter delay of silence descriptor (SID) packets that are received by the UE;

receiving, after the SID packets, media packets into the dejitter buffer; and releasing the media packets from the dejitter buffer based at least in part on the target delay value.

2. The method of claim 1, wherein the setting includes adjusting the target delay value based at least in part on the average jitter delay of the SID packets.

3. The method of claim 2, wherein the setting includes adjusting the target delay value further based at least in part on one or more of packet statistics or filter parameters of the SID packets.

4. The method of claim 1, wherein the setting includes adjusting the target delay value based at least in part on jitter delays of the SID packets if a difference between the jitter delays of the SID packets and the jitter delays of the media packets satisfies a difference threshold.

5. The method of claim 1, wherein the setting includes adjusting the target delay value based at least in part on jitter delays of the SID packets if the jitter delays of media packets are not available or are older than an age threshold.

6. The method of claim 1, wherein the setting includes setting the target delay value if a current target delay value is smaller than a candidate target delay value that is computed based at least in part on the average jitter delay of the SID packets.

7. The method of claim 6, wherein the candidate target delay value is computed based at least in part on an overall jitter value of the SID packets multiplied by a scaling factor.

8. The method of claim 1, further comprising: decoding the media packets that are released from the dejitter buffer; and processing the decoded media packets for media output.

9. The method of claim 8, further comprising outputting the media output.

10. A user equipment (UE) for wireless communication, comprising:

a memory; and one or more processors, coupled to the memory, individually or collectively configured to cause the UE to:

set a target delay value for a dejitter buffer of the UE based at least in part on an average jitter delay of silence descriptor (SID) packets that are received by the UE;

receive, after the SID packets, media packets into the dejitter buffer; and release the media packets from the dejitter buffer based at least in part on the target delay value.

11. The UE of claim 10, wherein the one or more processors are individually or collectively configured to cause the UE to adjust the target delay value based at least in part on the average jitter delay of the SID packets.

12. The UE of claim 11, wherein the one or more processors are individually or collectively configured to cause the UE to adjust the target delay value further based at least in part on one or more of packet statistics or filter parameters of the SID packets.

13. The UE of claim 10, wherein the one or more processors are individually or collectively configured to cause the UE to adjust the target delay value based at least in part on jitter delays of the SID packets if a difference between the jitter delays of the SID packets and the jitter delays of the media packets satisfies a difference threshold.

14. The UE of claim 10, wherein the one or more processors are individually or collectively configured to cause the UE to adjust the target delay value based at least in part on jitter delays of the SID packets if the jitter delays of media packets are not available or are older than an age threshold.

15. The UE of claim 10, wherein the one or more processors are individually or collectively configured to cause the UE to set the target delay value if a current target delay value is smaller than a candidate target delay value that is computed based at least in part on the average jitter delay of the SID packets.

16. The UE of claim 15, wherein the candidate target delay value is computed based at least in part on an overall jitter value of the SID packets multiplied by a scaling factor.

17. The UE of claim 10, wherein the one or more processors are individually or collectively configured to cause the UE to:

decode the media packets that are released from the dejitter buffer; and process the decoded media packets for media output.

18. The UE of claim 17, wherein the one or more processors are individually or collectively configured to cause the UE to output the media output.

19. A non-transitory computer-readable medium storing a set of instructions for wireless communication, the set of instructions comprising:

one or more instructions that, when executed by one or more processors of a user equipment (UE), cause the UE to:

set a target delay value for a dejitter buffer of the UE based at least in part on an average jitter delay of silence descriptor (SID) packets that are received by the UE;

receive, after the SID packets, media packets into the dejitter buffer; and release the media packets from the dejitter buffer based at least in part on the target delay value.

20. The non-transitory computer-readable medium of claim 19, wherein the one or more instructions further cause the UE to adjust the target delay value based at least in part on the average jitter delay of the SID packets.

21. The non-transitory computer-readable medium of claim 20, wherein the one or more instructions further cause the UE to adjust the target delay value further based at least in part on one or more of packet statistics or filter parameters of the SID packets.

22. The non-transitory computer-readable medium of claim 19, wherein the one or more instructions further cause the UE to adjust the target delay value based at least in part on jitter delays of the SID packets if a difference between the jitter delays of the SID packets and the jitter delays of the media packets satisfies a difference threshold.

23. The non-transitory computer-readable medium of claim 19, wherein the one or more instructions further cause the UE to adjust the target delay value based at least in part on jitter delays of the SID packets if the jitter delays of media packets are not available or are older than an age threshold.

24. The non-transitory computer-readable medium of claim 19, wherein the one or more instructions further cause the UE to set the target delay value if a current target delay value is smaller than a candidate target delay value that is computed based at least in part on the average jitter delay of the SID packets.

25. An apparatus for wireless communication, comprising:

means for setting a target delay value for a dejitter buffer of the apparatus based at least in part on an average jitter delay of silence descriptor (SID) packets that are received by the apparatus;

means for receiving, after the SID packets, media packets into the dejitter buffer; and means for releasing the media packets from the dejitter buffer based at least in part on the target delay value.

26. The apparatus of claim 25, further comprising means for adjusting the target delay value based at least in part on the average jitter delay of the SID packets.

27. The apparatus of claim 26, further comprising means for adjusting the target delay value further based at least in part on one or more of packet statistics or filter parameters of the SID packets.

28. The apparatus of claim 25, further comprising means for adjusting the target delay value based at least in part on jitter delays of the SID packets if a difference between the jitter delays of the SID packets and the jitter delays of the media packets satisfies a difference threshold.

29. The apparatus of claim 25, further comprising means for adjusting the target delay value based at least in part on jitter delays of the SID packets if the jitter delays of media packets are not available or are older than an age threshold.

30. The apparatus of claim 25, further comprising means for setting the target delay value if a current target delay value is smaller than a candidate target delay value that is computed based at least in part on the average jitter delay of the SID packets.

* * * * *